M. O. COX.
ANIMAL TRAP.
APPLICATION FILED NOV. 5, 1908.
921,204.
Patented May 11, 1909.
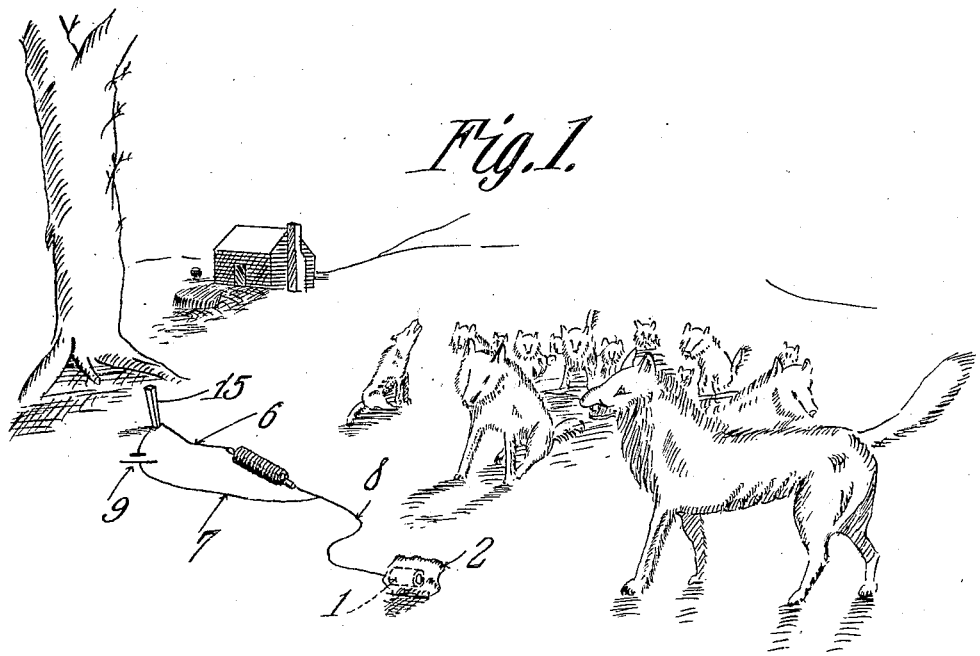
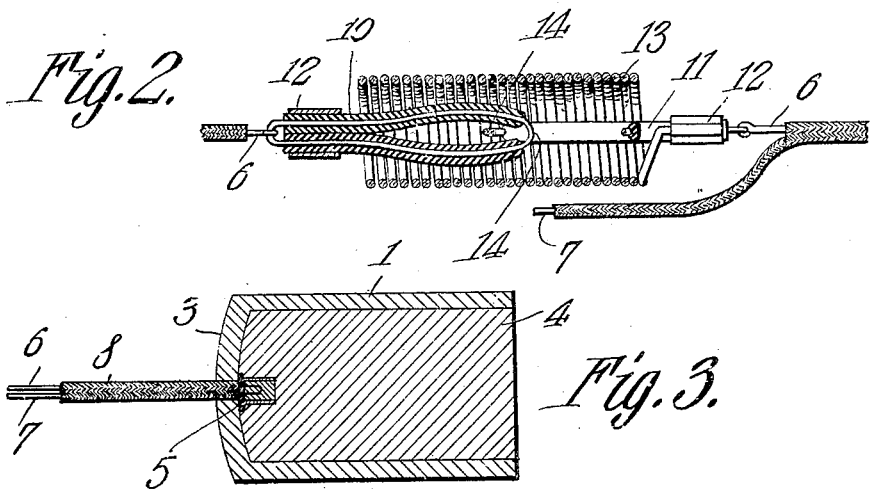
Witnesses
Inventor
Martin O. Cox.
By C. A. Snow & Co.
Attorneys

UNITED STATES PATENT OFFICE.

MARTIN O. COX, OF TYGH VALLEY, OREGON.

ANIMAL-TRAP.

No. 921,204.  Specification of Letters Patent.  Patented May 11, 1909.

Application filed November 5, 1908. Serial No. 461,175.

*To all whom it may concern:*

Be it known that I, MARTIN O. COX, a citizen of the United States, residing at Tygh Valley, in the county of Wasco and State of Oregon, have invented a new and useful Animal-Trap, of which the following is a specification.

This invention has reference to improvements in animal traps and is designed for the destruction of animals of no commercial value but which are destructive to life or property. Among such animals may be mentioned wolves, and coyotes, which animals are not easily enticed into ordinary traps and which it is desirable to kill outright and at the same time frighten other animals of like nature away.

In accordance with the present invention an explosive is used within the bait and means are provided whereby the animal in attempting to carry off the bait will cause the ignition of the explosive. By this means the animal seizing the bait causes its own dedestruction and if a high explosive such as dynamite be used then other animals in the immediate vicinity may also be killed while the noise of the explosion will tend to frighten other animals not killed or injured but still in the vicinity so that they will not be liable to again return to the scene of the explosion.

The invention will be best understood from a consideration of the following detail description taken in connection with the accompanying drawings forming a part of this specification, in which drawings, Figure 1 is a perspective view of the device forming the subject matter of the present invention and showing the manner of its use. Fig. 2 is a longitudinal section through a portion of the device showing the electric circuit closing means. Fig. 3 is a longitudinal section of the explosive carrier or cartridge.

Referring to the drawings there is shown a casing 1 of such size that when inclosed in a suitable bait 2 the mass may be grasped in the mouth of an animal such as it is desirable to destroy.

The casing 1 is closed at one end as indicated at 3 and open at the other end and while this casing may be made of any suitable material it is desirable that it should be made of lead.

The casing is designed to be filled with a suitable explosive as indicated at 4 and preferably this explosive is dynamite but of course any other suitable explosive may be used, it being preferable however to use a high explosive and dynamite is a readily obtainable high explosive especially in regions where destructive animals which it is desirable to destroy are found.

A suitable dynamite cap 5 is located within the casing 1 at the closed end thereof and embedded in the dynamite and from this cap lead two conductors 6—7 suitably protected by insulation 8, the closed end 3 being provided with a perforation for the passage of the conductors.

The conductor 7 may extend to a battery 9 or other suitable source of electric current while the conductor 6 has its continuity broken by a circuit closing means best shown in Fig. 2. This circuit closing means consists of two insulated conducting loops 10—11 interlocking at their meeting ends as indicated in Fig. 2 and at these points the insulation is omitted so that when the loops are moved longitudinally one on the other the non-insulated parts will come in contact to there complete a circuit. The other ends of the loops are also bared of insulation and are there connected to the broken ends of the conductor 6.

At the ends of the loops 10 and 11 where they join with the conductor 6 they are each surrounded by a sleeve 12 made fast to the corresponding end of a helical spring 13 which latter houses the contacting ends of the loops 10 and 11. The normal tendency of the spring 13 is to remain in the contracted position and in this position the circuit closing ends of the loops 10 and 11 which in the drawing are indicated at 14 are separated one from the other and are prevented from closing the circuit by the insulated portions of the said loops. Any force tending to draw the separated ends of the conductor 6 away one from the other will tend to extend the spring 13 and permit the ends 14 of the loops 10 and 11 to make contact one with the other and thus close the circuit of the battery 9 and the current from said battery will flow to the cap 5 and cause the ignition of said cap which in turn will cause the explosion of the dynamite 4 within the casing 1. The conductors 6 and 7, or in the particular structure shown in Fig. 1 the conductor 6 is made fast to a peg 15 driven into the ground or to any other fixed structure.

If now an animal attracted by the bait should seize the bait and try to carry it away, or at least drag it a sufficient distance to put a strain upon the spring 13, which latter need not be of more than very moderate strength, then the spring will give and the two terminals 14 will be brought into electrical contact thus completing the circuit from the battery through the cartridge and the dynamite will thereby be exploded to the destruction of the animal carrying the bait and to other animals in the immediate vicinity, while any animals not within the destructive zone of the dynamite will be frightened by the explosion and the destruction of their companions so that there is little or no liklihood of their returning to the vicinity of the disaster to them.

The only part of the device that need be renewed is the casing 1 and the cartridge 5 together with the dynamite. These parts however are inexpensive and may be easily replaced when it is desired to again use the device, which repeated use is advisable in the general vicinity or neighborhood infested with the animals it is desirable to destroy.

Accidental explosion of the dynamite is prevented by the retractal force of the spring 13 which may be strong enough to resist ordinary handling of the bait and cartridge and loaded casing, but which will yield to the eager tugging of an animal desirous of carrying off the bait.

What is claimed is:—

1. An animal trap comprising a receptacle for an explosive, a charged electric circuit for causing the ignition of the explosive, and a normally open circuit-closer movable to the closed position by a force applied to the receptacle for the explosive.

2. An animal trap comprising a receptacle for an explosive adapted to be embedded in suitable bait, an electric circuit for firing the explosive, and a circuit closer operable by the animal to fire the explosive on an attempt by the animal to carry off the bait.

3. An animal trap comprising a receptacle for an explosive adapted to be embedded in a suitable bait, a charged electric circuit for igniting the explosive, a circuit closer in said circuit, and means for normally holding the circuit closer inactive and yieldable to a force applied to the receptacle by an animal attempting to carry off the bait.

4. An animal trap having means for holding an explosive and adapted to be embedded in a suitable bait, an electric circuit and means for charging the same, means included in the circuit and located in the explosive container for firing the explosive, and a normally open circuit closer controlling the electric circuit and comprising two circuit terminals and a spring tending to maintain the terminals separated but yieldable to a superior force to permit contact of the terminals.

5. An animal trap having means for holding an explosive and adapted to be embedded in a suitable bait, an electric circuit and means for charging the same, means included in the circuit and located in the explosive container for firing the explosive, and a normally open circuit closer controlling the electric circuit and comprising two circuit terminals and a spring housing the terminals and tending to maintain the terminals separated but yieldable to a superior force to permit contact of the terminals.

In testimony that I claim the foregoing as my own, I have hereto affixed my signature in the presence of two witnesses.

MARTIN O. COX.

Witnesses;
PAUL LAMBERT,
CARL F. MERTZ.